(12) United States Patent
Reilly, Jr.

(10) Patent No.: US 6,324,724 B1
(45) Date of Patent: Dec. 4, 2001

(54) CASTER WHEEL ASSEMBLY WITH FLEXING PLATE

(75) Inventor: Earl J. Reilly, Jr., Prospect, CT (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 09/588,931

(22) Filed: Jun. 7, 2000

(51) Int. Cl.⁷ .................................................. B60B 33/00
(52) U.S. Cl. ......................................... 16/29; 16/44
(58) Field of Search ........................ 16/29, 30, 35 D, 16/31 R, 44; 244/188.8, 188.9

(56) References Cited

U.S. PATENT DOCUMENTS

| | | | |
|---|---|---|---|
| 331,211 | * 11/1885 | Osborn et al. | 16/29 |
| 499,783 | * 6/1893 | Frank | 16/29 |
| 742,770 | * 10/1903 | Wheeler | 16/29 |
| 2,738,539 | * 3/1956 | Schultz, Jr. | 16/29 |
| 2,738,540 | * 3/1956 | Kramcsak, Jr. | 16/29 |
| 3,478,381 | * 11/1969 | Schultz, Jr. | 16/29 |
| 3,639,942 | * 2/1972 | Ostrom | 16/29 |
| 4,187,578 | * 2/1980 | Little | 16/29 |
| 4,229,855 | * 10/1980 | Rowe | 16/29 |
| 4,459,920 | * 7/1984 | Cwik | 16/29 |

* cited by examiner

Primary Examiner—Chuck Y. Mah
(74) Attorney, Agent, or Firm—Pitney, Hardin, Kipp & Szuch LLP

(57) ABSTRACT

The caster wheel assembly includes a top plate with downwardly extending walls which terminate in bottom flanges to support the frame of a heavy cabinet. The caster wheel assembly further includes side flanges with eyelets through which screws or bolts pass to threaded apertures in the frame of the heavy cabinet. The top plate is configured to bend elastically and then inelastically in response to a force on the caster wheels, thereby reducing the force transmitted to the cabinet frame.

10 Claims, 6 Drawing Sheets

CASTER WHEEL ASSEMBLY WITH FLEXING PLATE

BACKGROUND OF THE INVENTION

1. Field of the Invention

The present invention relates to a caster wheel assembly for a cabinet, particularly a heavy cabinet, wherein side flanges of the caster wheel assembly are attached to the inside corner of the cabinet frame so that forces from dropping the cabinet are transferred to the caster plate thereby minimizing or eliminating damage to the cabinet.

2. Description of the Prior Art

It is well-known in the prior art to attach casters to cabinets. Typical prior art caster assemblies are bolted directly to the cabinet frame through the top plate by a nut and bolt arrangement. However, in this configuration, forces directed to the caster, particularly if the cabinet is dropped, are transmitted directly to the cabinet frame. This causes the cabinet frame, particularly if the cabinet is heavy, to tend to bend or buckle in response to such forces.

OBJECTS AND SUMMARY OF THE INVENTION

It is therefore an object of the present invention to provide a caster wheel assembly which can be attached to the frame of a cabinet, particularly a heavy cabinet, so that forces on the caster wheel assembly will tend to be absorbed by the caster wheel assembly rather than transmitted to the frame, thereby reducing or eliminating damage to the frame.

This and other objects are attained by providing a caster wheel assembly wherein the caster plate has two side flanges which are directly coupled to the cabinet frame so that when the cabinet and caster wheel assembly are dropped, the force on the caster wheel assembly will cause the top base plate holding the wheels to bend thereby sustaining and absorbing the force that would otherwise damage the cabinet frame.

DETAILED DESCRIPTION OF THE PREFERRED EMBODIMENT

Figure 1:
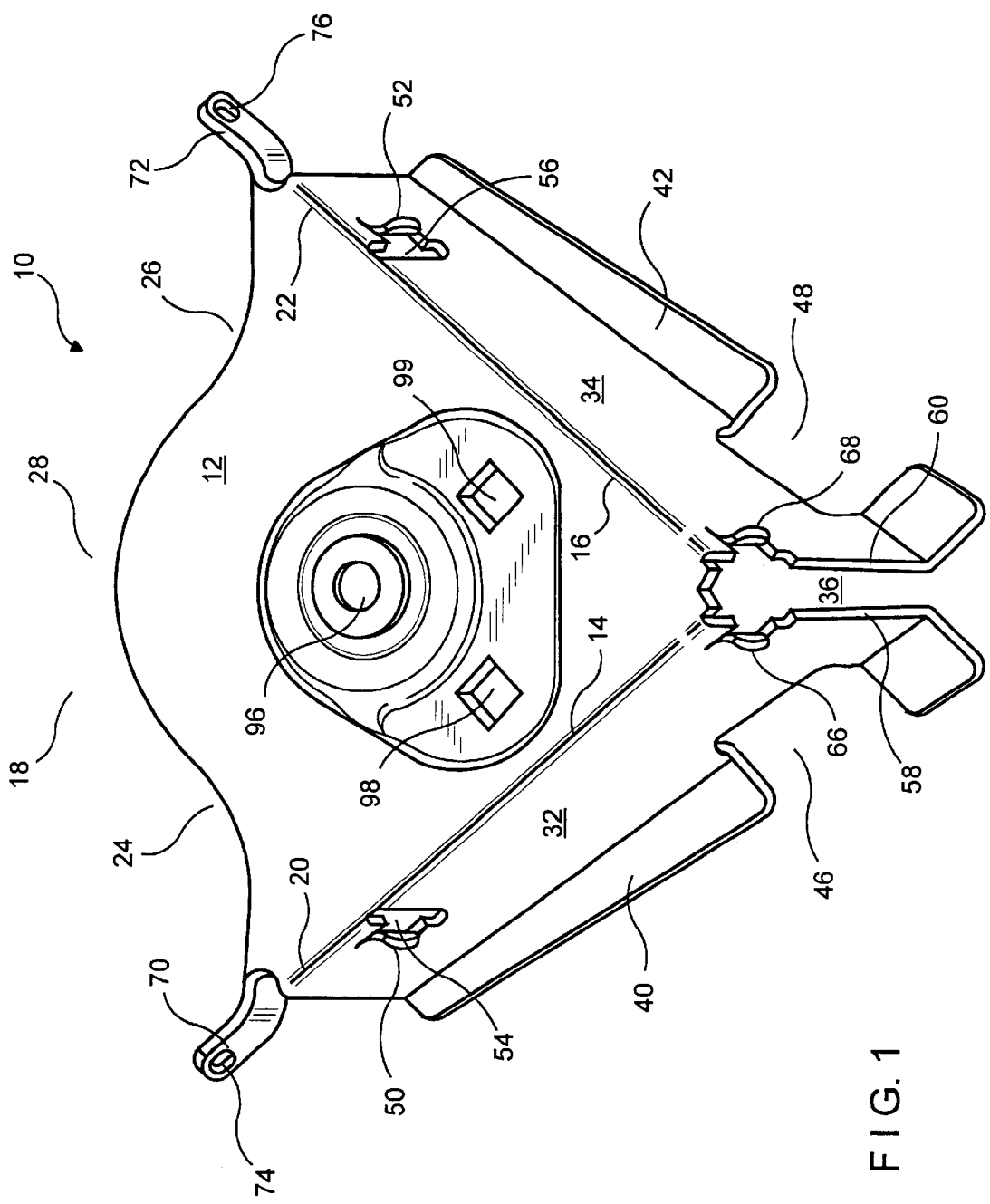
FIG. 1 is a top perspective view of a first aspect of the caster wheel assembly of the present invention.
Figure 2:
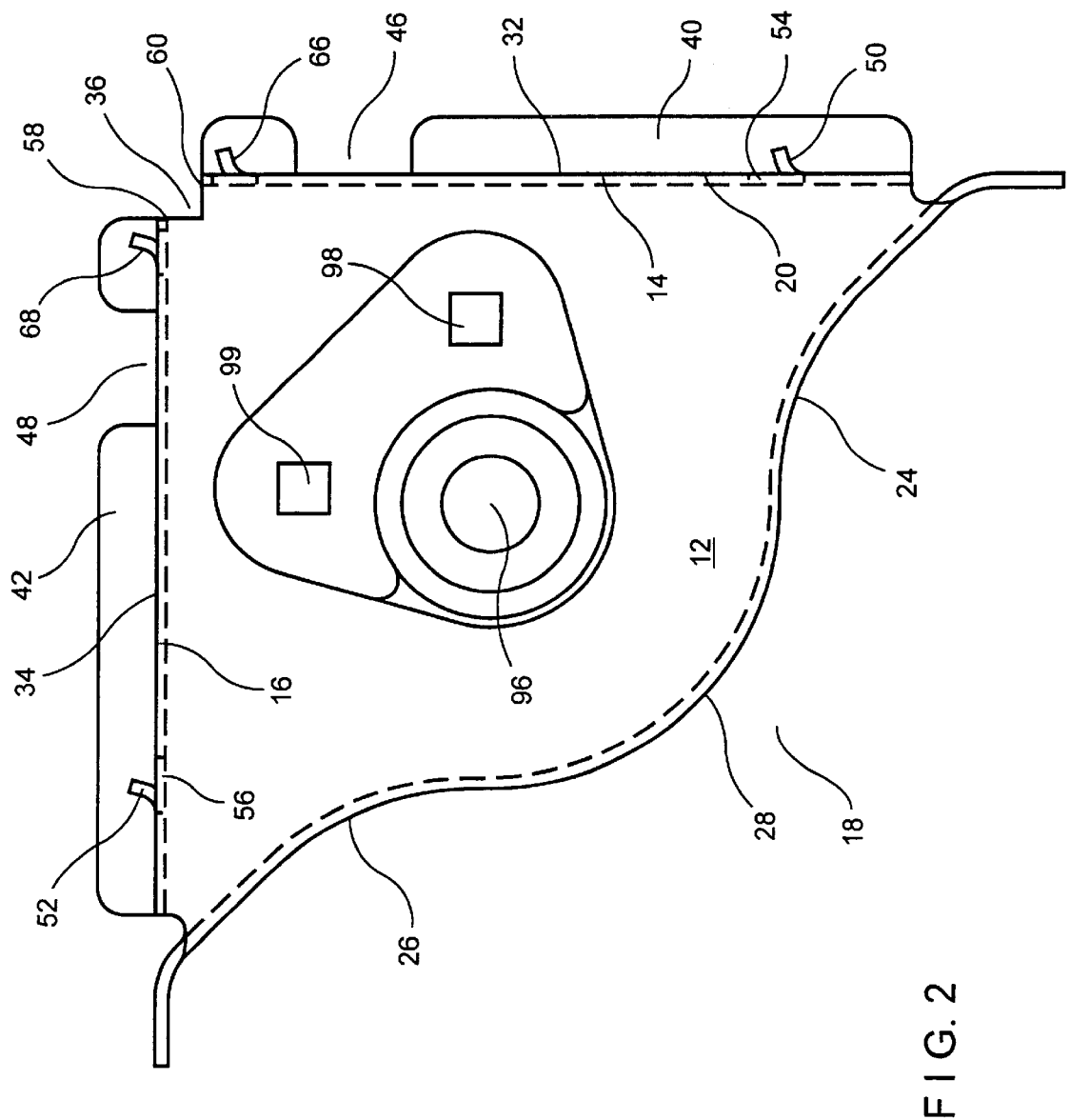
FIG. 2 is a top plan view of a first aspect of the caster wheel assembly of the present invention.

Referring now to the drawings in detail wherein like numerals indicate like elements throughout the several views, one sees that FIG. 1 is a perspective view of the caster wheel assembly 10 of the present invention. Caster wheel assembly 10 includes top plate 12 with first side 14 orthogonal to second side 16. An arcuate side 18 joins the ends 20, 22 of first and second sides 14, 16. Top plate 12 therefore has a somewhat triangular shape with one arcuate side. Arcuate side 18 includes concave portions 24, 26 adjacent to ends 20, 22 of first and second sides 14, 16, respectively and a central convex portion 28. First and second walls 32, 34 extend downwardly and perpendicularly from first and second sides 14, 16, respectively, of top plate 12. Gap 36 is formed between first and second walls 32, 34. First and second walls 32, 34 terminate in first and second bottom flanges 40, 42, respectively which are parallel to top plate 12. Recesses 46, 48 are formed in first and second bottom flanges 40, 42, respectively, and further extend partially upwardly into first and second sides 14, 16.

Alignment ears 50, 52 extend outwardly from first and second walls 32, 34 inwardly adjacent from ends 20, 22, respectively, and are formed from the material excised from first and second walls 32, 34 to form apertures 54, 56. Likewise, edges 58, 60 are formed by first and second walls 32, 34 and form the boundaries of gap 36. Alignment ears 66, 68 are formed by excising and extending material from edges 58, 60. Alignment ears 50, 52, 66, 68 are intended to be inserted into corresponded recesses in the cabinet frame (not shown) thereby aligning caster wheel assembly 10 during installation.

Figure 3:
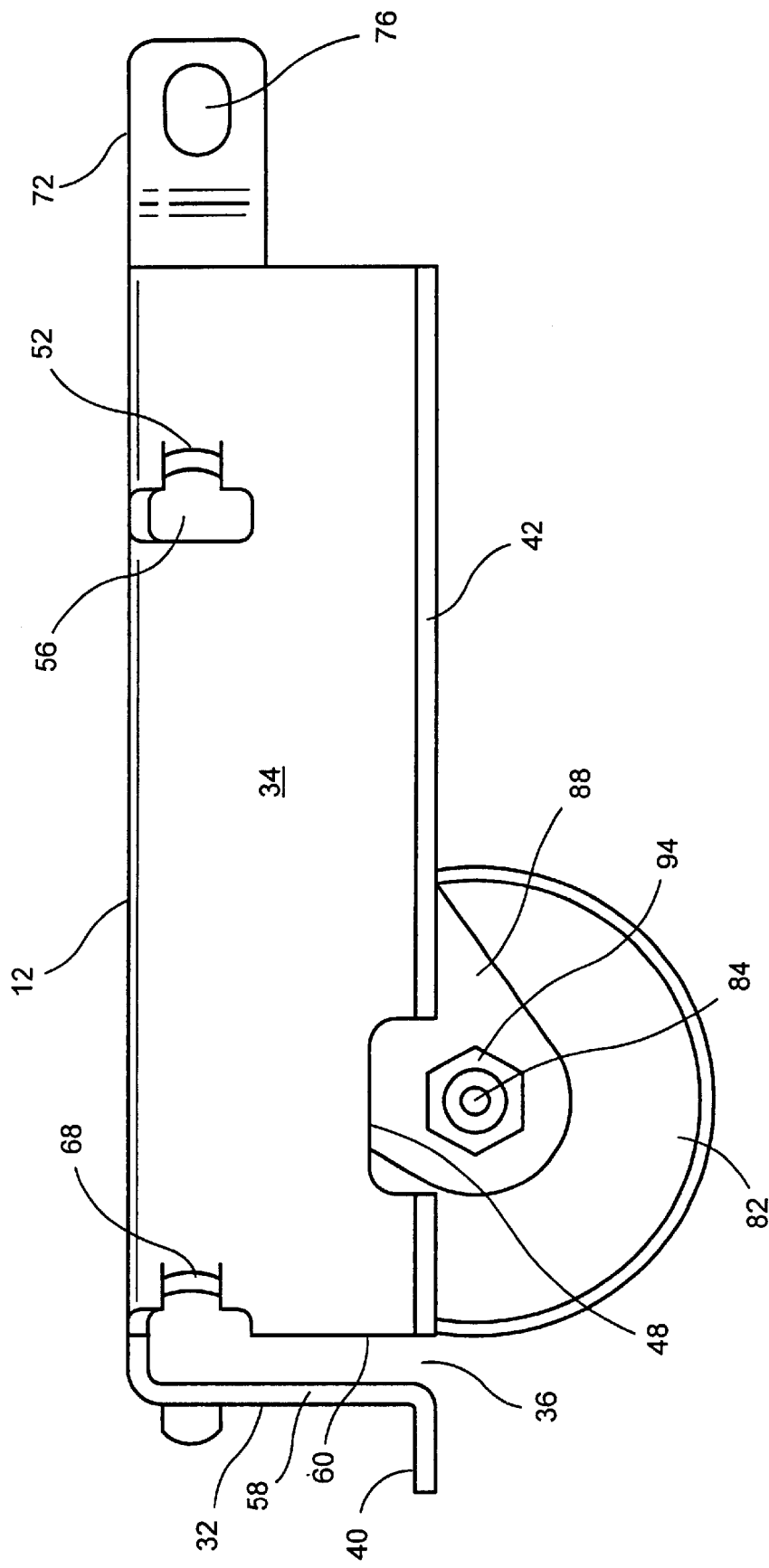
FIG. 3 is a front plan view of a first aspect of the caster wheel assembly of the present invention.
Figure 4:
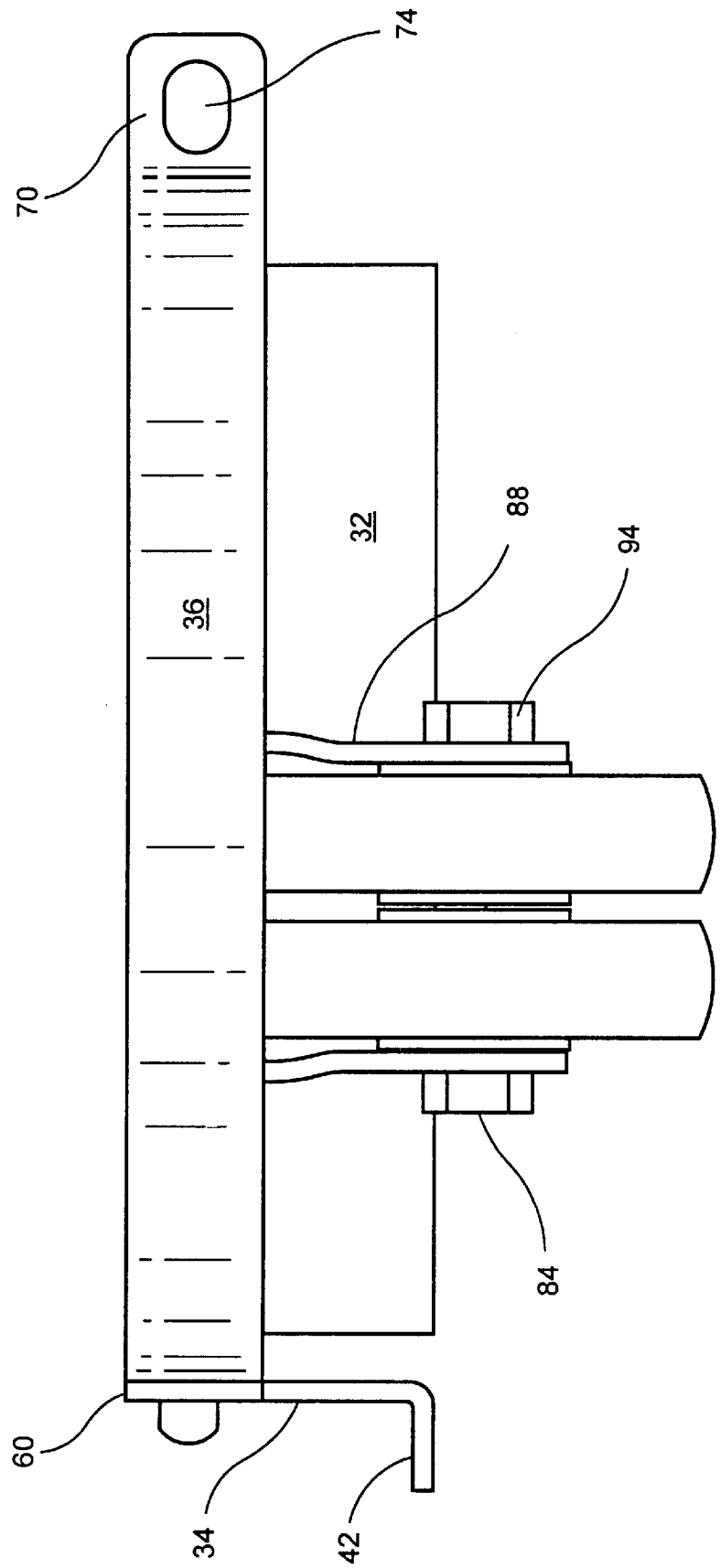
FIG. 4 is a side plan view of a first aspect of the caster wheel assembly of the present invention.
Figure 5:
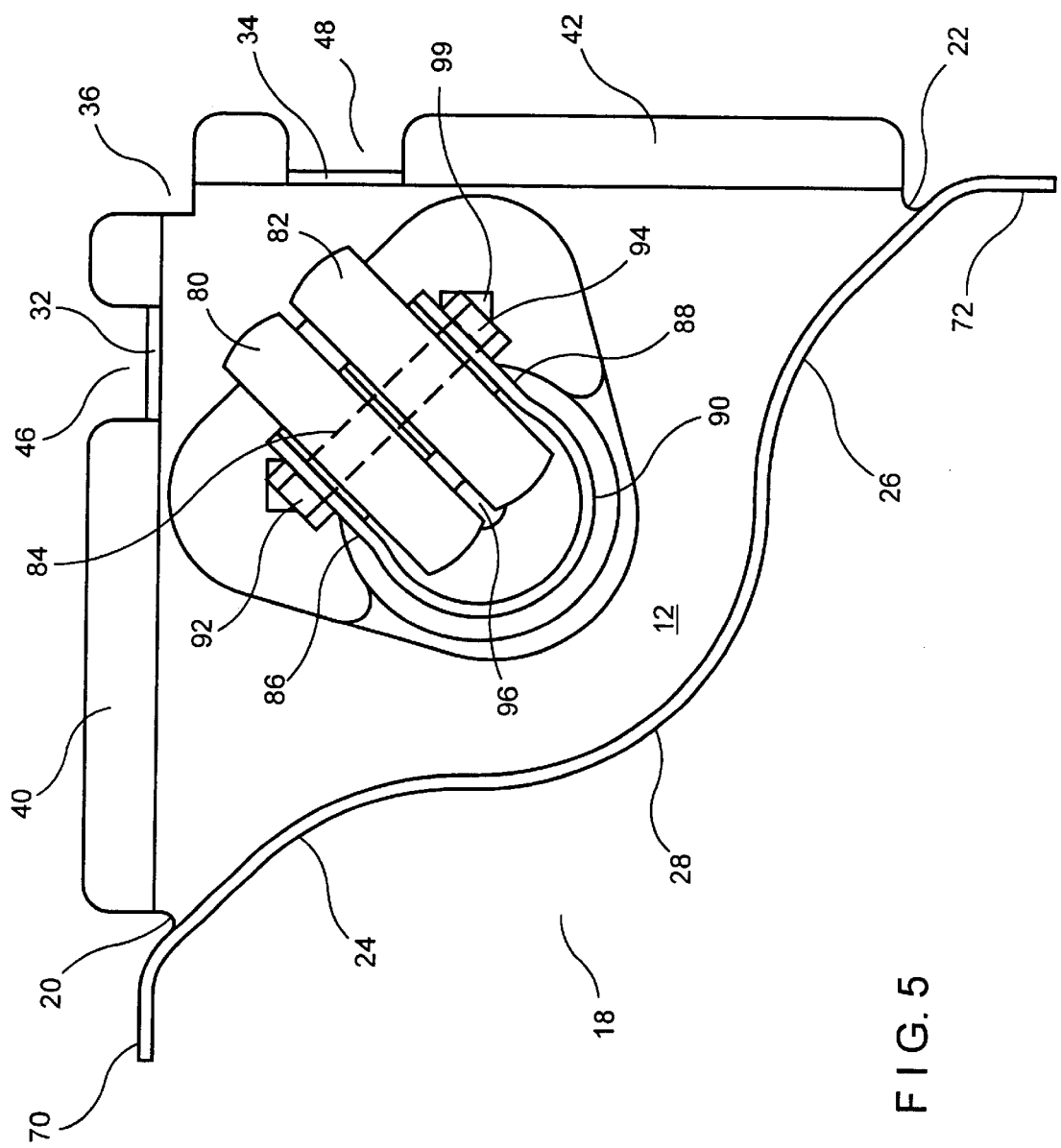
FIG. 5 is a bottom plan view of a first aspect of the caster wheel assembly of the present invention.

As can be seen from FIGS. 3, 4 and 5, third wall 36 extends downwardly in a lip configuration from arcuate side 18 and further extends outwardly past ends 20, 22 of first and second walls 32, 34 to form side flanges 70, 72, respectively, with eyelets 74, 76 formed therethrough. Side flanges 70, 72 are coplanar with first and second walls 32, 34, respectively. The arcuate character of side wall 18 aids in the transition of third wall 36 to form side flanges 70, 72 in this coplanar orientation with respect to first and second walls 32, 34. During installation, bolts or screws (not shown) pass through eyelets 74, 76 to fasten caster wheel assembly 10 to an interior corner of the frame of the cabinet (not shown).

Likewise, as can be seen from FIGS. 3, 4 and 5, casters 80, 82 are spaced apart and journaled for rotation about axis 84. Axis 84 passes through plates 86, 88 of support assembly 90 and is held in place by nuts 92, 94. Support assembly 90 is likewise journaled for rotation about axis 96 formed on top plate 12 (see FIG. 1).

Square apertures 98, 99 are formed outwardly from axis 96. Square apertures 98, 99 provide for an auxiliary mounting directly to a cabinet (not shown), when necessary.

Caster wheel assembly 10, particularly top plate 12 and the various pieces integral therewith, is made of hardened and tempered steel which will act first as a spring and then bend in response to force upon the caster wheel assembly. A typical material is hot roll steel 1010. Another typical material is 1050 cold roll steel which has been hardened and tempered to a Rockwell of 45–49 C to assure that the top plate 12 will act as a spring and then bend (that is, react elastically and then inelastically). Those skilled in the art will recognize that many equivalent materials may be used.

Figure 6:
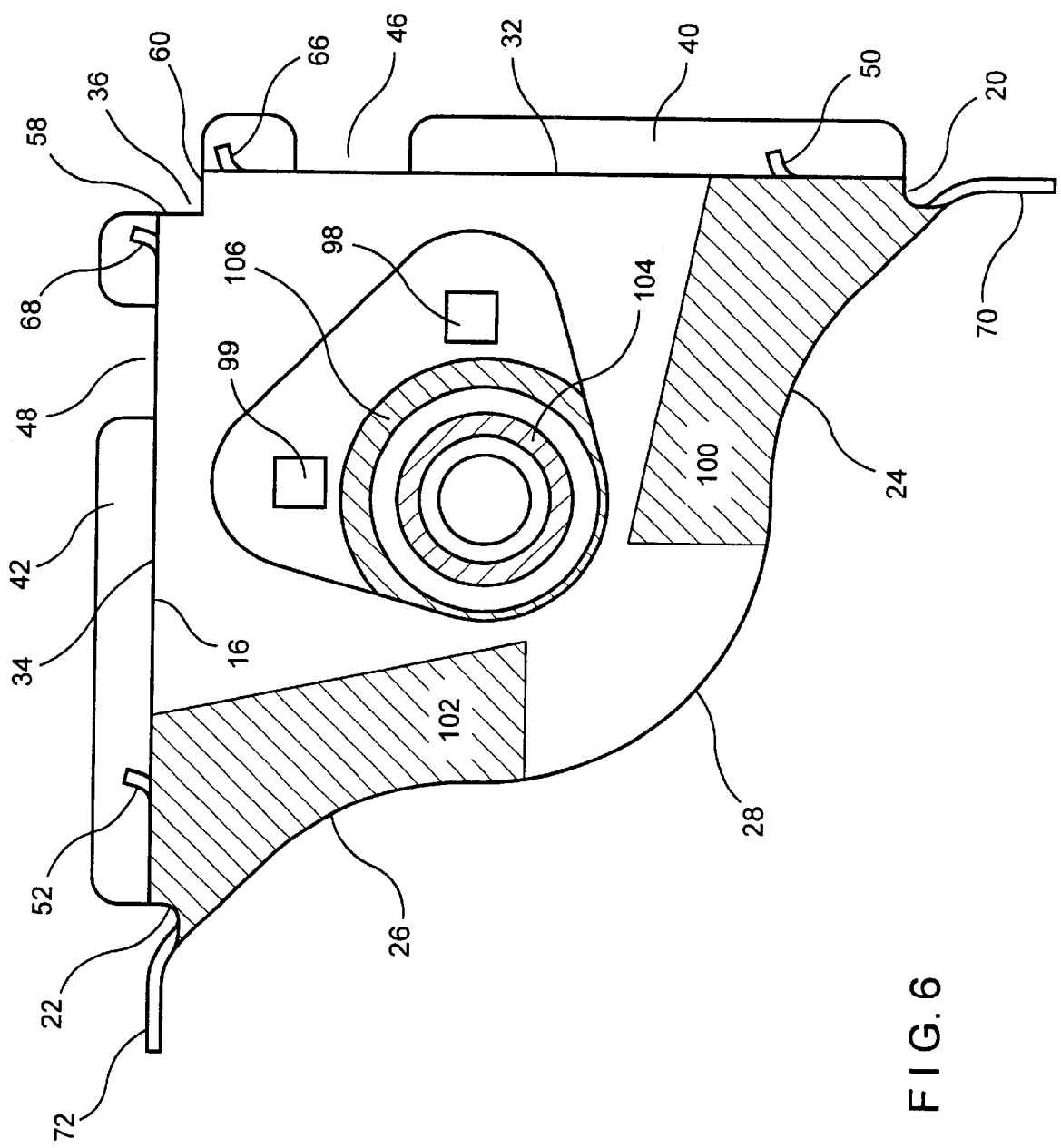
FIG. 6 is a top plan view of a second aspect of the caster wheel assembly of the present invention.

A second embodiment is shown in FIG. 6 wherein areas 100, 102 on top plate proximate to concave portions 24, 26, respectively of arcuate side 18 are lowered in elevation. Likewise, band 104 and a semi-circular portion of band 106 concentric with axis 96 on top plate 12 are raised in elevation. This configuration assists in the elastic deformation of top plate 12 in the event of the affixed cabinet being dropped.

In order to install caster wheel assembly 10 to a frame of a cabinet (not shown), the user aligns first and second bottom flanges 40, 42 to support the walls at an inside corner of the frame. Additionally, alignment ears 50, 52, 66, 68 are inserted into alignment recesses in the frame. Then, screws or bolts are passes through eyelets 74, 76 to engage corresponding threaded apertures in the frame. Thereafter, if the cabinet is dropped, top plate 12 will flex and/or bend so as to absorb at least part of the force of the drop so as to decrease any such force on the frame of the cabinet.

Thus the several aforementioned objects and advantages are most effectively attained. Although preferred embodiments of the invention have been disclosed and described in detail herein, it should be understood that this invention is in no sense limited thereby and its scope is to be determined by that of the appended claims.

What is claimed is:

1. A caster wheel assembly adapted to be aligned with and attached to a frame member, said caster wheel assembly including:

a top plate;

at least one side wall extending from the top plate in a direction perpendicular to the top plate;

at least one bottom flange formed at an end of said at least one side wall where said bottom flange extends from said at one least side wall in a direction perpendicular to said at least one side wall;

at least one side flange extending from the top plate in a direction perpendicular to the top plate;

an alignment ear formed on said at one least side wall wherein the alignment ear is formed by excising material from said at one least side wall and extending said material outwardly such that said alignment ears can align said caster wheel assembly with said frame member before an attachment with said frame member; and a caster support engaging a caster and engaging said top plate wherein said caster support includes at least one eyelet therethrough, through which a bolt or screw can pass for said attachment to said frame member.

2. The caster wheel assembly of claim 1 wherein said at least one side wall includes two side walls formed perpendicularly to each other so as to engage an inside corner of a cabinet; and wherein said at least one bottom flange includes a bottom flange formed on each of said two side walls.

3. The caster wheel assembly of claim 2 wherein a third wall is formed joining ends of two side walls, such that said third wall extends downwardly in a lip configuration, and wherein said at least one side flange includes two side flanges formed from said third wall.

4. The caster wheel assembly of claim 2 wherein said top plate is configured to first react in a spring-like manner and then bend in response to a force transmitted through said caster support.

5. A caster wheel assembly including:

a top plate;

at least one side wall extending from the top plate in a direction perpendicular to the top plate wherein said at least one side wall includes two side walls formed perpendicularly to each other so as to engage an inside corner of a cabinet;

at least one bottom flange formed at an end of at least one side wall and extending from said at least one side wall in a direction perpendicular to said at least one side wall where said at least one bottom flange includes a bottom flange formed on each of said two side walls;

at least one side flange extending in a direction perpendicular to the top plate;

a third wall formed by joining ends of said two side walls such that said third wall extends downwardly in a lip configuration, and wherein said at least one side flange includes two side flanges formed from said third wall such that a first of said two side flanges is coplanar with said first side wall and a second of said two side flanges is coplanar with said second side wall; and a caster support engaging a caster and engaging said top plate.

6. The caster wheel assembly of claim 5 wherein said two side flanges include eyelets therethrough, through which bolts or screws are intended to pass.

7. The caster wheel assembly of claim 6 wherein alignment ears are formed on said first and second side walls.

8. The caster wheel assembly of claim 7 wherein said alignment ears are formed by excising material from said first and second side walls and extending said material outwardly.

9. The caster wheel assembly of claim 8 wherein said caster support is journaled for rotation about a first axis perpendicular with said top plate, and further includes a second axis parallel to said top plate about which said caster is journaled for rotation.

10. The caster wheel assembly of claim 9 wherein portions of said top plate proximate to said third wall are lowered in elevation and portions of said top plate concentric with said first axis are raised in elevation.

* * * * *